United States Patent [19]

Alessio et al.

[11] 4,371,906
[45] Feb. 1, 1983

[54] OVERSPEED PROTECTIVE APPARATUS FOR A PORTABLE TOOL

[75] Inventors: Lorenzo E. Alessio, Lecco; Giuseppe Cuneo, Caloiziocorte, both of Italy

[73] Assignee: Black & Decker Inc., Newark, Del.

[21] Appl. No.: 160,583

[22] Filed: Jun. 18, 1980

[30] Foreign Application Priority Data

Jun. 28, 1979 [IT] Italy .................................. 23952 79

[51] Int. Cl.³ .............................................. H02H 1/00
[52] U.S. Cl. ................................. 361/51; 200/80 R; 310/68 E; 318/83; 318/325; 318/462
[58] Field of Search .......................... 361/23, 51, 237; 310/68 E, 75 A, 47, 50; 340/62; 200/80 R, DIG. 32, 31 CA; 318/325, 83, 351–353, 306, 397, 409, 462, 497, 519, 799, 526–529, 523

[56] References Cited

U.S. PATENT DOCUMENTS

| | | | |
|---|---|---|---|
| 411,783 | 10/1889 | Card | 318/351 X |
| 3,286,150 | 11/1966 | Wilson et al. | 318/351 X |
| 3,340,452 | 9/1967 | Lindner | 318/519 X |
| 3,510,615 | 5/1970 | Stelter | . |
| 3,564,372 | 2/1971 | Vogelsberg et al. | 361/23 X |
| 3,860,905 | 1/1975 | Guerini | 340/62 |

FOREIGN PATENT DOCUMENTS

| | | |
|---|---|---|
| 1763279 | 2/1972 | Fed. Rep. of Germany . |
| 2437541 | 2/1976 | Fed. Rep. of Germany . |
| 872314 | 7/1961 | United Kingdom . |

*Primary Examiner*—Reinhard J. Eisenzopf
*Attorney, Agent, or Firm*—Walter Ottesen; Edward D. Murphy; Harold Weinstein

[57] ABSTRACT

Disclosed is an overspeed protective apparatus for an electric motor having pairs of stator windings normally connected in parallel, the apparatus having an actuating mechanism responsive to an overspeed condition of the motor and an electrical switching assembly normally connecting the stator windings in parallel but adapted upon actuation by the actuating mechanism to interrupt the parallel connection and connect pairs of windings in series.

17 Claims, 7 Drawing Figures

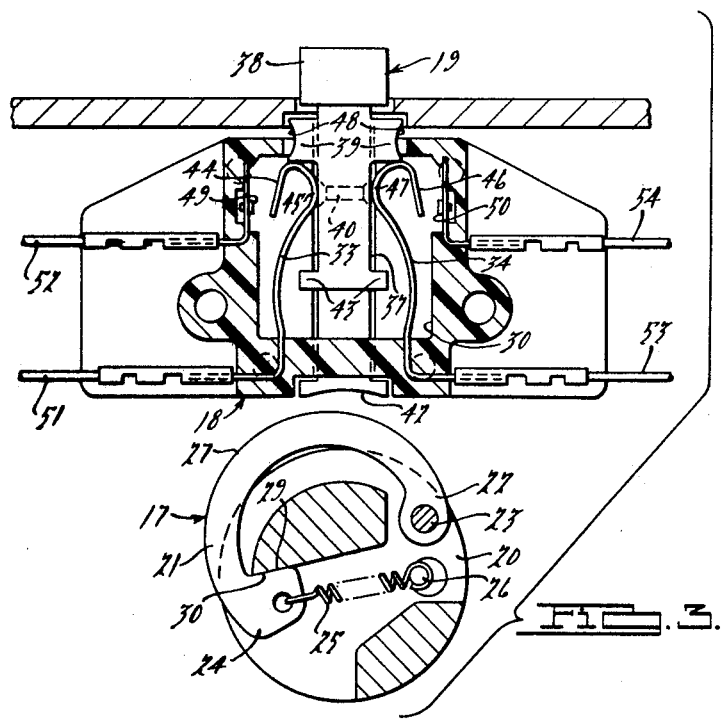
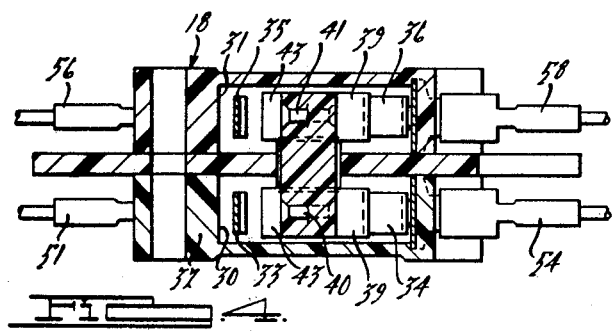

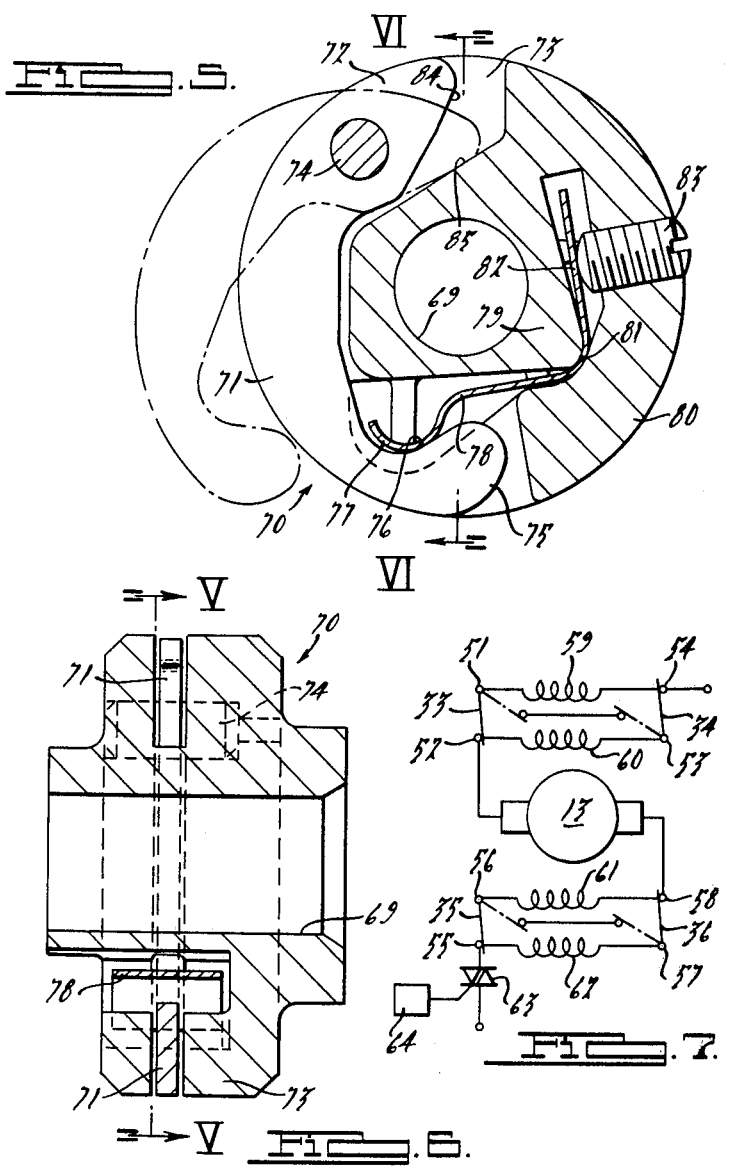

OVERSPEED PROTECTIVE APPARATUS FOR A PORTABLE TOOL

BACKGROUND OF THE INVENTION

The present invention relates to portable electric tools capable of obtaining an overspeed condition and in particular to portable electric tools having electronic speed control circuits which regulate the speed of the tool at a substantially constant speed regardless of operating load.

Portable electric tools are often equipped with electronic speed control circuits which regulate the speed of rotation of the motor shaft and which, when working properly, maintain a constant speed regardless of the load placed on the tool. A malfunction of such an electronic speed control circuit can result in the motor of the electric tool obtaining an overspeed condition.

Devices for preventing the operation of a tool at excessively high rates of speed are known in the art. One such measure is shown in German Pat. No. 1,763,279 which relates to use of a centrifugally actuated knife to cut the electric lead supplying power to the tool motor. Other alternative devices are broadly suggested in British Pat. No. 1,271,431, which suggests devices to isolate the main power supply if the speed exceeds a maximum permissible value or alternatively to limit speeds to less than a maximum value by means of a speed limiting circuit. There remains, however, a need for an improved overspeed protective arrangement which protects against operation at an overspeed condition and yet also allows continued use of the tool thereafter. It would, of course, be desirable if such an overspeed protective arrangement could be provided in a practical and economical manner so as not to unduly increase the cost of manufacturing the tool.

SUMMARY OF THE INVENTION

In accordance with the present invention an overspeed protective arrangement for an electric motor having pairs of stator windings normally electrically connected in parallel comprises an actuating mechanism responsive to an overspeed condition of the motor, such as a centrifugal switch operatively connected to a shaft of the motor, and an electrical switching assembly normally connecting the stator windings in parallel but adapted, upon actuation by the actuating mechanism to interrupt the parallel connection and connect the windings in series. Thus, broadly speaking, the present invention includes means for sensing the speed of a motor which, if sensing a speed beyond a predetermined level activates a switching means which, in the preferred embodiment, changes the connection of the pair or pairs of stator windings of the motor from a parallel to a series connection. It will, of course, be readily appreciated that such a change substantially reduces the speed of the motor yet allows continued use of the motor at the reduced speed. Additionally, the series connection is maintained until the condition generating the motor overspeed is corrected.

BRIEF DESCRIPTION OF THE DRAWINGS

FIG. 3 is a view similar to that of FIG. 2 but showing the overspeed protective arrangement in an actuated condition;

FIG. 4 is a sectional view taken along line IV—IV in FIG. 2;

FIG. 5 is a sectional view taken along line V—V in FIG. 6 of an alternative centrifugal release mechanism for use in the present invention;

FIG. 6 is a sectional view taken along line VI—VI of FIG. 5; and

FIG. 7 is a schematic view of the electrical circuit of the present invention.

DESCRIPTION OF THE INVENTION

Figure 1:
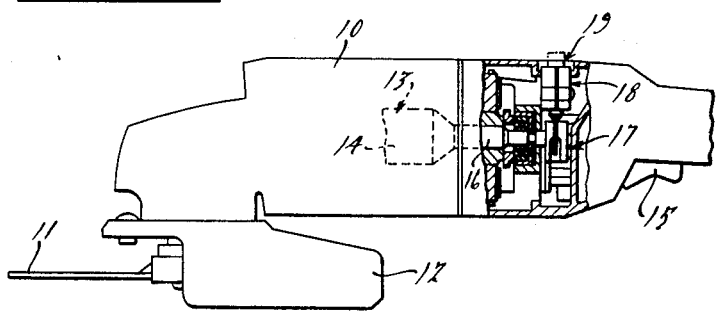
FIG. 1 is an elevational view, broken away, of an angle grinder incorporating the overspeed protective arrangement of the present invention.

Now referring to the Figures, FIG. 1 shows an overspeed protective arrangement of the present invention in operative association with a portable electric tool, angle grinder 10, equipped with an electronic speed control circuit. Angle grinder 10 has a grinding disc 11 shielded by a rotating guard 12 and an electric motor 13 which has stator windings (or field coils) normally interconnected in parallel in pairs. In short, motor 13 has two field windings for each stator pole which are normally connected in parallel. In use, angle grinder 10 is turned on by the operator by means of trigger switch 15 whereupon armature 14 rotatably drives shaft 16 which in turn drives grinding disc 11. Mounted on the end of shaft 16 and adapted to rotate therewith is a spring loaded centrifugal release mechanism 17 which is adapted to sense whenever the rotational speed of shaft 16 exceeds a predetermined maximum speed. Actuation of centrifugal release mechanism 17 actuates electrical switch 18 which operates to change the connection of pairs of stator windings from parallel to series connections.

Thus, during normal operation the stator windings are connected in parallel and the tool can develop its maximum power output. However, should the tool obtain an overspeed condition due to a malfunction of the electronic speed control circuit or for any other reason, the overspeed protective arrangement of the present invention will operate to change the normally parallel connections of the stator windings to series connections. This, of course, reduces the power output of the tool substantially to remove the overspeed condition. However, the tool will still operate, although at a much reduced power output, so that the operator can use the tool despite the malfunction until it is repaired. It will be appreciated by those skilled in the art that modification of the connections of the pairs of stator windings from parallel to series connections effectively reduces the maximum power output of the electric motor to a level which will not be capable of obtaining an overspeed condition.

Should an overspeed condition develop to activate the protective arrangement of the present invention, electrical switch 18 provides a visual indication that an overspeed condition has occurred by means of a plunger 19 which, upon activation of electrical switch 18, projects outwardly from the housing of portable grinder 10 as is shown in phantom lines in FIG. 1. Thus, the operator will be made aware that the overspeed protective arrangement has been activated and has thereby caused the reduced operating speed of the tool.

Figure 2:
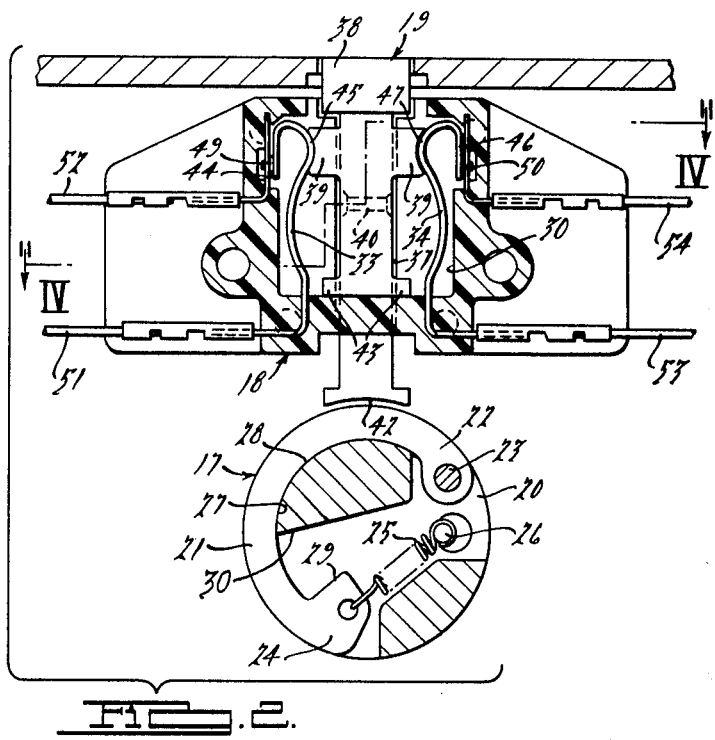
FIG. 2 is a sectional view of the overspeed protective arrangement operatively associated with the tool of FIG. 1 shown in a normal position.

An additional feature of the preferred embodiment of the present invention is that electrical switching assembly 18 cannot be simply reset by the operator in disregard of the condition or malfunction which led to the overspeed condition. The plunger 19 is moved from its first or normal position (as shown in FIG. 2) and is maintained in an extended or second position (as shown in FIG. 3) and can be reset only by a service facility personnel or other personnel by dismantling or replacing switch assembly 18. Thus, the centrifugal release mechanism 17, upon its actuation, remains dormant until the malfunction (which generated the overspeed condition) has been corrected.

The structures of centrifugal release mechanism 17 and electrical switching assembly 18 are shown in more detail in FIG. 2-4. FIG. 2 shows centrifugal release mechanism 17 and electrical switching assembly 18 in a normal or non-activated position while FIG. 3 shows centrifugal release mechanism 17 and electrical switching assembly 18 in an overspeed or activated position.

Centrifugal release mechanism 17 includes a disc 20 which has mounted thereon an arcuate arm 21 which is responsive to centrifugal force. Thus, one end portion 22 of arcuate arm 21 is pivotally mounted on disc 20 by pivot arm 23 and the opposite end 24 of arcuate arm 21 is connected to a helical spring 25 which is connected between the aforementioned end portion 24 and a fixed position 26 on disc 20. Spring 25 biases end portion 24 of arcuate arm radially inwardly toward fixed position 26 and normally holds radially inwardly facing surface 27 of arcuate arm 21 against radially outwardly facing surface 28 of abutment 30 formed on disc 20. However, and as shown in FIG. 3, when the rotational speed of shaft 16 of motor 13 exceeds a selected or predetermined speed, the centrifugal force on arcuate arm 21 causes its outward movement from the position shown in FIG. 2 to the position shown in FIG. 3. In moving to the position shown in FIG. 3, an outer abutment surface of arcuate arm 21 comes into contacting relationship with cooperating abutment surface 42 of plunger 19 to thereby move plunger 19 in an upward direction as viewed in FIGS. 2 and 3 and hence, to actuate electrical switching assembly 18. Surface 29 of end portion 24 of arcuate arm 21 contacts cooperating abutment surface 30 to limit the radially outward movement of arcuate arm 21.

Electrical switching assembly 18 has two separate cavities 30 and 31 in stationary housing 32, each cavity 30 and 31 accommodating one pair of leaf-spring contacts 33, 34 and 35, 36 respectively. Positioned between leaf spring contacts 33 and 34 and 35 and 36 is a plunger 19 which is slidably disposed with respect to housing 32. It will, of course, be readily appreciated that plunger 19 and housing 32 must be comprised of non-conductive material such as plastic or the like. Plunger 19 includes a generally parallelepiped shaped body portion 37. A head 38 at the free end thereof is adapted to extend outwardly from the tool housing upon actuation of switching assembly 18, or more specifically plunger 19. Four transversely projecting protuberances 39 are provided to maintain leaf spring contacts 33, 34, 35, and 36 in a normal position when plunger 19 of switching assembly 18 is in a normal or non-actuated position. Upon actuation of plunger 19, protuberances 39 cooperate with the free ends of leaf spring contacts 33, 34, 35, and 36 to provide a stop means to prevent resetting plunger 19 to a normal or nonactuated position. A pair of transversely extending metal screws 40 and 41 provide electrical conductive means for electrically connecting suitable leaf spring contacts, when plunger 19 is actuated, to interconnect the respective pairs of stator windings in series. The end opposite head 38 presents a cooperating abutment surface 42, to the outer abutment surface of arcuate arm 21 for actuation of plunger 19 by centrifugal release mechanism 19. Plunger 19 also has four smaller transversely projecting protuberances 43 adapted to provide a stop against housing 18.

The free end of each leaf spring contact 33, 34, 35, and 36 is reversely bent to provide, with respect to plunger 19, an inwardly facing curved portion and an outwardly facing free end portion. Thus, as is shown in FIGS. 2 and 3, leaf spring contact 33 has an inwardly facing curved portion 45 and an outwardly facing free end portion 44 while leaf spring contact 34 has an inwardly facing curved portion 47 and an outwardly facing free end portion 46. Each curved portion of each leaf spring contact is adapted to fit into a correspondingly curved portion 48 of one of the projections 39 when plunger 19 is in a normal position. This serves to selectively retain plunger 19 in a normal position. It will, of course, be appreciated that the spring contacts are spring biased against the protuberances 39.

Electrical switch assembly 18 switchingly interconnects four pairs of leads electrically connected to the windings of motor 13. In the normal or nonactuated configuration as shown in FIG. 2, each of spring leaf contacts 33, 34, 35, and 36 are held outwardly by a protuberance or laterally-projecting portion 39 such that the outwardly facing free end portion thereof is in contacting relationship with an adjacent contact to provide a normal parallel connection for the stator windings. For example, free end portion 44 of leaf spring contact 33 is in electrical contact with contact 49 to which is connected lead 52 and free end portion 46 of leaf spring contact 34 is in electrical contact with contact 50 to which is connected lead 54. As the fixed end of leaf spring contact 33 is electrically connected to lead 51 and the fixed end of leaf spring contact 34 is electrically connected to lead 53, it will be seen that spring contact 33 interconnects leads 51 and 52 while spring contact 34 interconnects leads 53 and 54. Leaf spring contacts 35 and 36 are positioned in an analogous manner so that spring contact 35 interconnects leads 55 and 56 while spring contact 36 interconnects leads 57 and 58.

A better understanding of the electrical circuitry of the present invention can be had by referring to FIG. 7, which shows an electrical schematic illustrating the electric power supply circuit of motor 13. The circuit includes two pairs of stator windings 59, 60, 61, and 62 to which power is supplied via a control circuit including a triac 63 whose firing angle is controlled by a conventional speed control unit 64 to thereby control the current applied to the motor 13. Stator windings 59 and 60 are normally connected in parallel as are stator windings 61 and 62. Thus, in the normal or nonactuated condition of electrical switch assembly 18, lead 51 is connected to lead 52, lead 53 is connected to lead 54, lead 55 is connected to lead 56, and lead 57 is connected to lead 58.

However, leaf spring contacts 33, 34, 35, and 36 are operable to change the normal parallel connections to series connections as is shown in phantom lines in FIG. 7. Upon sensing an overspeed condition, centrifugal release mechanism 17 actuates electrical switching assembly 18. Arcuate arm 21 is extended outwardly in response to the centrifugal force associated with the overspeed condition and comes into contacting relationship with plunger 19, thus actuating plunger 19 by forcing it upwardly as viewed in FIG. 2 toward the position shown in FIG. 3. It will be appreciated that arcuate arm 21 provides the force for the initial movement of plunger 19 but that the completed movement is obtained with the aid of the reversely curved end portions of the spring leaf contacts 33, 34, 35, and 36 which cooperate with protuberances 39 to urge plunger 19 into a full actuated position. Upon obtaining the position shown in FIG. 3, the protuberances 39 of plunger 19 no longer maintain the outwardly facing free-end portions of spring leaf contacts 44 and 46 in electrical engagement with adjacent contacts 49 and 50. Furthermore, leaf spring contacts 33, 34, 35, and 36 are spring biased inwardly toward plunger 19 so that spring contacts 33 and 34 come into contacting relationship with transverse screw 40 and spring contacts 35 and 36 come into contacting relationship with transverse screw 41 to electrically interconnect lead 51 to lead 53 and lead 56 to lead 57. This obtains the series electrical connection illustrated in phantom lines in FIG. 7.

Now referring to FIGS. 5 and 6, an alternative centrifugal release mechanism is shown and indicated generally by the numeral 70. Centrifugal release mechanism 70 can be substituted for centrifugal release mechanism 17 to function to actuate electrical switching assembly 18 is a similar manner. Release mechanism 70 has a centrally disposed hole 69 for mounting on motor shaft 16 to rotate therewith and has an arcuate arm 71 responsive to centrifugal force. One end portion 72 of arm 71 is pivotally attached to a disc 73 by pivot pin 74. The other end portion 75 of arcuate arm 71 is hook shaped and has a radially inwardly facing surface 76 which is snappingly engaged by a free end 77 of a spring 78 blade which is biased thereagainst. Spring blade 78 is partly disposed in a channel between projections 79 and 80 formed on disc 73 and is pivotally disposed about a corner 81 of projection 79. Opposite end portion 82 of leaf spring 78 is biased against one end of a set screw 83 which is threadably disposed through projection 80 and which can be adjusted to consequently adjust the tension applied by end portion 77 of blade spring 78 against surface 76 and hence, adjust the amount of centrifugal force required to release arcuate arm 71. Release of arcuate arm 71, of course, actuates the associated electrical switching mechanism. The extent to which arcuate arm 71 can move outwardly is shown in phantom lines in FIG. 5. Surface 84 of end portion 72 comes into abutting relationship against surface 85 of abutment 79 to limit outward movement of arm 71.

While the above description constitutes the preferred embodiments of the invention, it will be appreciated that the invention is susceptible to modification, variation, and change without departing from the proper scope or fair meaning of the accompanying claims.

We claim:
1. A power tool, comprising:
an electric motor having at least one pair of stator windings electrically connected in parallel;
actuating means, coupled to said motor and responsive to the rotational speed thereof, for sensing an overspeed malfunction wherein the motor speed exceeds a predetermined maximum operating speed;
electrical switch means, connected in circuit with said stator windings and responsive to the sensing by said actuating means of an overspeed malfunction, for switching the electrical connection of said pair of stator windings from said parallel connection to a series connection to reduce the motor speed to below said predetermined operating speed; and
means, associated with said electrical switch means, for rendering said switch means unactuatable once actuated so as to maintain said series connection of the stator windings until the power tool is dismantled for repair;
whereby the power tool can continue to be used by an operator at said reduced speed after the overspeed malfunction has occurred, but said switch means cannot be simply reset by the operator in disregard of the malfunction.

2. The power tool of claim 1 wherein said electrical switch means comprises a two-state device adapted to switch from a first normal position to a second overspeed position upon the sensing by said actuating means of an overspeed condition.

3. The power tool of claim 2 wherein said electrical switch means includes means for providing a visual indication of said overspeed position.

4. The power tool of claim 1 wherein said actuating means comprises a centrifugal switch coupled to the armature of said motor.

5. The power tool of claim 4 wherein said centrifugal switch includes means for varying said predetermined maximum operating speed to which said overspeed condition is sensed.

6. A portable tool, comprising:
a motor capable of operating at a first uncontrolled high speed;
an electronic speed-control circuit for controlling the operating speed of the motor at a predetermined speed below said first uncontrolled speed;
actuating means responsive to an overspeed condition wherein the speed of the motor exceeds said predetermined speed as a result of a failure of said speed-control circuit;
circuit means operable in a first mode for allowing the motor to operate at said first uncontrolled speed in the event of a failure of said speed control circuit, and selectively operable in a second mode for causing the motor to operate at a second uncontrolled safe speed less than said first uncontrolled speed;
said circuit means including a switch operatively connected to said actuating means for switching said circuit means into said second mode when said actuating means responds to said overspeed condition; and
means for preventing operation of said switch by an operator to switch said circuit means back from said second mode to said first mode, whereby after occurrence of the overspeed condition the motor continues to operate at said second uncontrolled safe speed and is precluded from operating at said first uncontrolled speed.

7. The tool of claim 6 further including means for providing a visual indication of said overspeed condition.

8. In an overspeed protective device for a power tool comprising an electric motor having at least one pair of stator windings normally electrically connected in parallel, the improvement characterized by:

actuating means coupled to said motor and responsive to the rotational speed thereof for sensing an overspeed condition wherein the motor speed exceeds a predetermined maximum operating speed; and electrical switch means connected in circuit with said stator windings and responsive to the sensing by said actuating means of an overspeed condition for switching the electrical connection of said stator windings from said normal parallel connection to a series connection;

said electrical switch means comprising at least one pair of leaf-spring contact members and a plunger member slidable between a normal position and an overspeed position, said pair of contact members having free ends maintained in electrical contact with respective first pair of stator winding leads by said plunger member when in said normal position, and said pair of contact members being spring biased and adapted to break electrical contact with said first pair of stator winding leads and electrically connect a respective second pair of stator winding leads when said plunger member is moved from said normal position to said overspeed position.

9. The power tool of claim 8 wherein said actuating means is adapted to cause said plunger to move from said normal position to said overspeed position when an overspeed condition is sensed.

10. A power tool, comprising:

an electric motor having two pairs of stator windings connected in series with the windings of each pair being connected in parallel;

a centrifugal mechanism coupled to said motor for rotation thereby, and having an actuating part which is moved a limited distance when an overspeed malfunction occurs and the motor exceeds a predetermined operating speed, and including a stop for limiting movement of said actuating part to said limited distance;

a switch, connected in circuit with said stator windings, and having a contact member movable by said actuating part, and including means for moving said contact member a further distance, after said actuating part has moved said limited distance, to switch the electrical connection of the windings in each said pair of stator windings from parallel to series so reducing the motor speed below said predetermined operating speed;

and means for preventing return movement of said contact member after movement by said moving means to maintain said series connection of the windings in each said pair of windings;

whereby the power tool can continue to be used by an operator at said reduced speed after the overspeed malfunction has occurred, but said switch cannot be simply reset by the operator in disregard of the malfunction.

11. The power tool of claim 10, wherein said centrifugal mechanism is connected to a shaft driven by the motor.

12. The power tool of claim 10, further including means providing an indication of the actuation of said switch and the subsequent reduction in the motor speed.

13. In a portable electric tool having a housing with a motor therein, the motor having at least one pair of field coils, an overspeed protective device comprising, in combination, a centrifugal mechanism connected to the motor for sensing the speed thereof, a plunger in the housing and actuatable by the centrifugal mechanism at a predetermined maximum speed to move the plunger from a normal first position to an alternate second position, first contact means engaged by the plunger in its first position for normally connecting the field coils in parallel with each other, second contact means engaged by the plunger in its second position for connecting the field coils in series with each other, thereby reducing the motor speed, and means subsequently preventing the plunger from returning from its second position to its first position.

14. The combination of claim 13, wherein the plunger has a portion extending beyond the housing in its second position, thereby providing a visual indication to the operator that a malfunction condition exists.

15. The combination of claim 13, wherein the centrifugal mechanism includes a pivotable arm engaging an inner portion of the plunger within the housing.

16. The combination of claim 13, wherein the first contact means includes at least one pair of leaf-spring contacts, one on each side of the plunger, each contact having a retained end and a free end, a first pair of leads connected to the retained ends, respectively, a second pair of leads having respective terminals, laterally extending portions on the plunger, respectively, for normally holding the free ends of the contacts against the respective terminals in the first position of the plunger, the free ends of the contacts being separated from the respective terminals in the second position of the plunger, a contact member carried by the plunger and bridging the free ends of the contacts together in the second position of the plunger, and the free ends of the contacts being received beneath the laterally-extending portions of the plunger, thereby retaining the plunger in its second position and preventing the plunger from returning to its normal first position.

17. In a portable electric tool having a housing with a motor therein, and an overspeed protective means to constantly sense the motor speed, said means being actuated to reduce the speed when a predetermined maximum level has been reached to thereby detect a malfunction condition in the tool, the subcombination of electrical switching means including a plunger moving from a first normal position to a second extended position when the overspeed protective means has been actuated, the plunger being retracted within the housing in its first position and being extended beyond the housing in its second position, thereby providing a visual indication to the operator of the malfunction condition in the tool, and means preventing the plunger from being reset from its second extended position to its first retracted position until the malfunction condition has been alleviated.

* * * * *